UNITED STATES PATENT OFFICE.

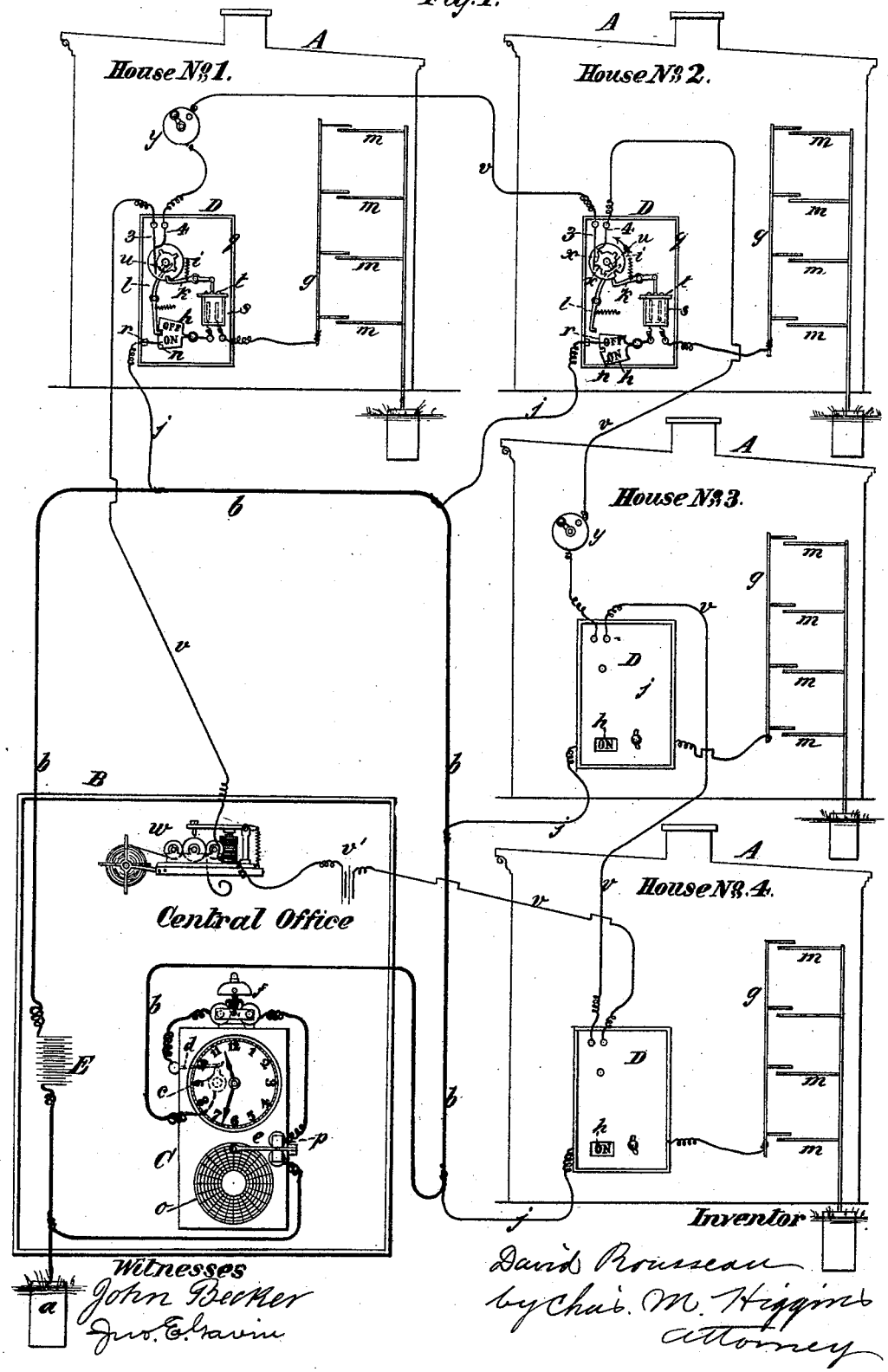

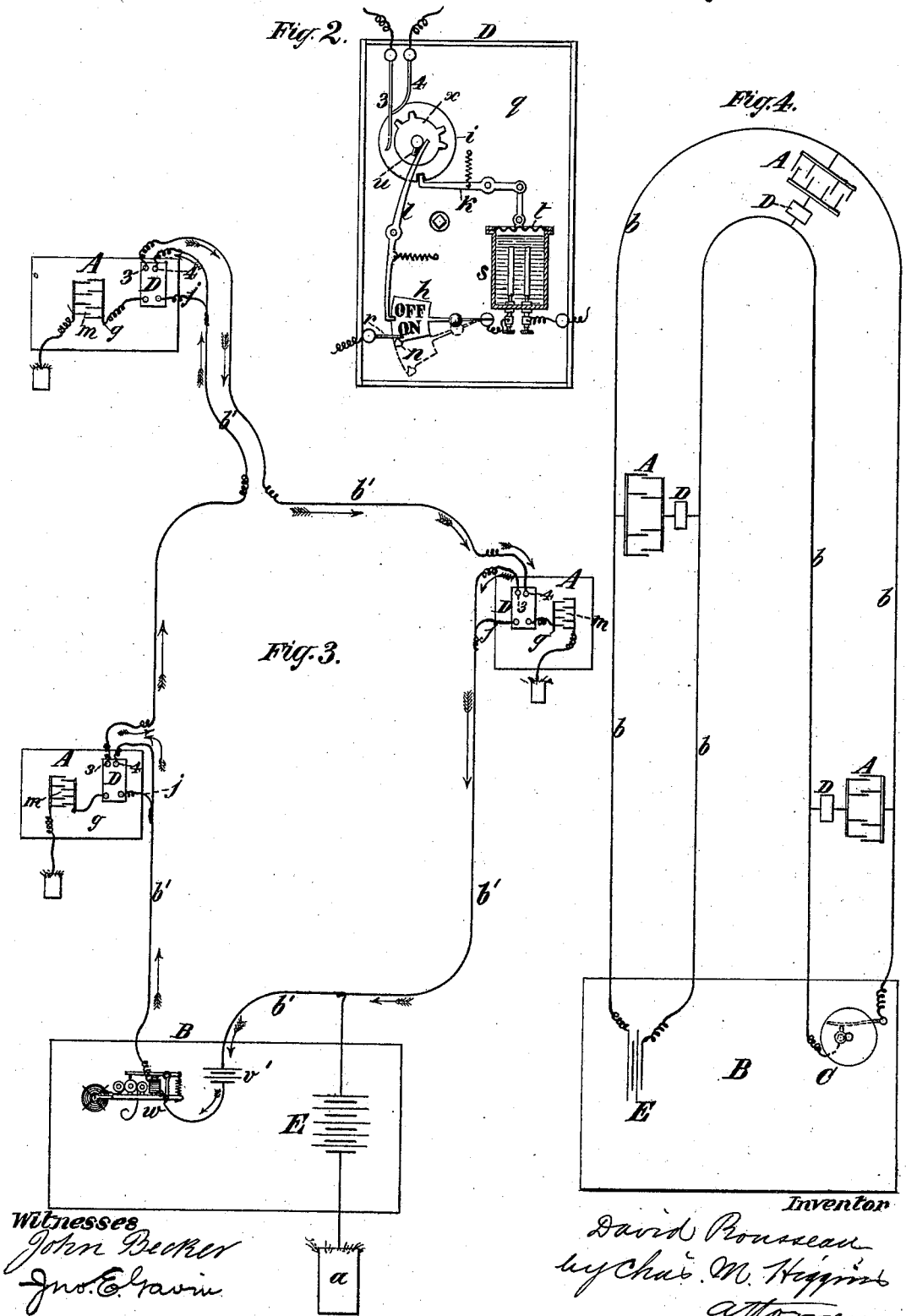

DAVID ROUSSEAU, OF NEW YORK, N. Y.

CIRCUIT-CONTROLLER FOR COMBINED DISTRICT-TELEGRAPH AND DOMESTIC-SUPPLY CIRCUITS.

SPECIFICATION forming part of Letters Patent No. 322,973, dated July 28, 1885.

Application filed July 11, 1884. (No model.)

*To all whom it may concern:*

Be it known that I, DAVID ROUSSEAU, of New York city, New York, have invented certain new and useful Improvements in Electrical District Circuits, of which the following is a specification.

My invention applies more especially to circuits for dwelling or business houses to operate the various household electric instruments therein, such as electric bells, gas-lighters, burglar-alarms, &c., which are usually placed in open circuit. Heretofore it has always been usual to provide each house with its own distinct circuit, supplied with its own individual battery; and in practice several objections arise in this system, owing, chiefly, to the neglect of the householder to properly attend to the battery and other parts of the circuit, and from the fact that the battery and instruments are liable to occasional derangements which are not understood and cannot be easily remedied by the ordinary householder, with the result of rendering the entire circuit sometimes inoperative and causing many objections from the householder, and requiring the frequent attention of the electrician. Now, according to my present improvement, I supply a series of houses from one central office from a common or central battery one pole of which is preferably grounded, while the other pole connects to a line which extends to the houses and connects with one terminal of the instruments therein, while the opposite terminal connects to earth, the respective houses being thus in multiple-arc circuit with the central battery, either through the ground or through a return-wire; hence, if the circuit be closed through any instrument in any house, current will be supplied thereto from the central battery and operate the instrument without the necessity of having any battery in the house, and without the necessity of any attention on the part of the householder, and hence by this system the house may be supplied with electricity from a central office for a small rental, without trouble to the householder, and at less cost than where each house is provided with its own battery. Where this system is adopted, however, it will be necessary that the central office should know when any derangement of the circuit occurs in any particular house—that is, any prolonged closure or grounding of the circuit, and in order to effect this I introduce, between the circuit of each house and the line or central battery, an automatic electric cut-off, which acts on the principle of that shown in my former patent, No. 279,107, to break the circuit whenever it remains closed beyond a certain length of time, and thus detach the house from the line and prevent the waste of the central battery. In connection with this cut-off I provide an automatic telegraphic signal arranged in each house and connected with a receiving-instrument in the central office, and I operatively connect the cut-off with the signal, so that when the cut-off acts an individualizing signal is sent to the central office to show that a certain house is cut off the line, and calling for attention from the central office to correct the defect in that house. In addition to this, I provide an intermittent automatic circuit-closer in the main line, operated by clock-work or time mechanism to close the main line at certain intervals and operate an alarm or recording device in the central office, and thus show whether the main line is intact or not, so that the failure of the alarm or recording device to act at any interval will show that the line is cut or is defective in some part and will call for attention from the central office. By this means I form a simple and effective system whereby a whole district or series of houses in a city may be supplied from one central office, and the circuit and instruments in all the houses properly attended to and operated without requiring care on the part of the tenant, and at much less cost than where each house is supplied with a distinct circuit and battery, thus presenting most important advantages; and my invention, therefore, consists in the features here outlined, as hereinafter fully set forth.

In the drawings, Figure 1 presents a general diagram showing all the features of my system in its preferred form. Fig. 2 is an enlarged view of one of the cut-off and signal instruments placed in each house. Fig. 3 is a diagram showing a modification of the battery-supply and signal circuits, and Fig. 4 is a simple diagram showing the essentials of the system with the signal-circuit omitted.

Referring to Fig. 1, A A indicate a series of distinct houses, which may be continued to—say, one hundred in number—forming an electric district, and B indicates a central office from which all the houses of the district are supplied and managed. In the central office, or at any other suitable point, is placed a powerful central or common battery, E, of the open-circuit class, and one pole of the battery is preferably connected to ground, as indicated at $a$, while the other pole of the battery connects to a metallic wire or line, $b\ b$, which runs out of the office through the electric district to each house and returns into the office and passes to certain devices on a powerful and accurate clock, C, placed in the central office, as shown, and from the clock the line connects to the other end of the battery, as illustrated. The mechanism of the clock revolves a contact tooth or disk, $c$, at regular speed—say, once in five minutes—which, hence, makes contact at said intervals with a tongue, $d$, and as the line is completed, as shown, through said contacts $c\ d$, the line is thus closed regularly at such intervals for a short instant of time, say the fraction of a second. The clock-work also revolves a graduated paper disk, $o$, somewhat in the manner of watchmen's clocks, and over this disk is mounted an armature-lever, $e$, carrying at one end a punching or marking point arranged to approach the paper disk; and this armature-lever is mounted over a magnet, $p$, which is placed in the line $b$, as shown, and the lever has of course a suitable retracting device, so that when the magnet is not in circuit the marking-point of the lever is withdrawn from the recording-disk $o$. In the main line within the central office is also placed an electric bell, $f$, or equivalent alarming device, and it will therefore be now seen that as the circuit is closed at every five minutes by the clock C, through the operation of the contacts $c\ d$, the bell $f$ will sound and the magnet $p$ will attract its armature-lever $e$ and force the punching or marking point into the recording-disk $o$, after which the point will be withdrawn by the retraction; hence, by this means the condition of the line is indicated every five minutes or at other intervals, so that while the line is intact the bell will sound, and the marker will mark or record at every interval; but if the line is cut or defective at any point the fact will be indicated by the failure of the bell to sound or the marker to mark and hence the attendants in the central office will know that some defect has occurred, and can proceed at once to correct it and to notify and guard the houses in the meantime. If the defect in the line is such as cannot be corrected in a short time, then the attendants in the central office may carry to each house a small sealed chloride-of-silver battery, and connect it temporarily with the circuit therein, so as to supply the houses independently during the time in which the line is being repaired; but this precaution will hardly ever be required, except in very extreme cases. Each house A is presumed to be provided with the usual household electrical instruments—such as burglar-alarms, electric bells, gas-lighters, &c.—and these instruments are indicated by the broken lines or branches $m\ m$, which show that the circuit is normally open through them, and that one terminal of all the instruments is connected to earth, while the other terminals are connected to a common conductor, $g$, which is connected through the connections (shown and hereafter described) with the main-supply line $b$; hence, if any one of the branches or instruments $m$ is closed, current will pass along the line from the central battery and return to the battery through the earth, and thus actuate the instrument, and the battery will of course be of sufficient strength to actuate any number of instruments in the same house, or in a number of distinct houses, at the same time, if the circuit happens to be closed at a number of points simultaneously. The circuit may, of course, return to the battery by a distinct return-wire, instead of through the earth, as indicated in Fig. 4, if preferred, and from this diagram and from Fig. 1 it will also be noted that the instruments in the houses are all connected with the main line and central battery in multiple arc, which is of course a necessary arrangement in this class of circuits.

Now, in each house, D indicates the cut-off and signal instrument, which is circuited in any part of the house-branch between the house-instruments and the central battery, preferably between the main line $b$ and the house-conductor $g$, as shown in Fig. 1.

In this instrument, $q$ indicates a clock-work motor or common clock-movement, which may consist only of the ordinary striking-train, and $i$ indicates the detent-wheel of the train, which is shown projecting on the exterior of the case, the rest of the movement being inclosed. This detent-wheel is normally engaged by the detent-lever $k$, which thus keeps the clock-work inactive and restrains the detent-wheel from revolving, as will be readily understood.

$h$ indicates a gravitating contact and annunciator plate pivoted at one end on the clock-work $h$, and normally lifted up with its notched edge engaged and held by a catch-lever, $l$, in which position a contact-pin, $n$, on the plate $h$ will touch a contact-tongue, $r$, which tongue is connected by the branch wire $j$ with the main line $b$.

Now, $s$ indicates an electrolytic cell, such as shown in the patent of Phelps, No. 281,202, of which I am the assignee, which cell is charged with acidulated water, and is covered by a distendable diaphragm, $t$, and incloses two platinum or other terminals, immersed in the water, as shown, in the well-known manner. One of the terminals is connected with the pivoted end of the contact-tag $h$, and the other terminal with the main conductor $g$ of the house, as fully illustrated in Figs. 1 and 2. It will therefore be observed that when the circuit is closed in any of the house branches or instruments $m$ $m$, the current will pass from the central battery to the main line, to the instrument in the house, through the contacts $n$ $r$ and the electrolytic cell $s$, and hence gas will be generated in the cell, which will tend to raise the diaphragm, which diaphragm is connected, as shown, with the detent-lever $k$. Now, in the regular operation of any of the electrical instruments in the house, the circuit is closed but for a momentary period—such as in lighting the gas, ringing a bell, &c.—and no prolonged closure of the circuit occurs in normal practice. During such momentary closure, therefore, sufficient gas will not be generated in the cell $s$ to lift the diaphragm or affect the detent-lever $k$. If, however, the circuit should continue closed for an abnormal time by some defect in the electrical instruments, either in the failure of push-buttons to open or electrodes to separate on the gas-burners, or by a crossing of wires at some point, the cell will then continue to generate gas, which will accumulate and finally lift the diaphragm $t$ and move the detent-lever $k$ from out of engagement with the detent-wheel $i$, which will now revolve by the force of the clock-movement and cause a cam-projection, $u$, on the center of the wheel to strike the catch-lever $l$, and thus release the plate $h$, which will at once drop and separate the contacts $r$ $n$, and thus break the house-circuit, or cut off the house from the main line, as shown in house No. 2 in Fig. 1, thus preventing the waste of battery and the derangement of the entire circuit that might result if the waste of the battery was longer continued. After the house-circuit is thus broken the generation of gas is immediately stopped and that already accumulated escapes through the pores of the diaphragm or through a small leak-hole, and the diaphragm gradually sinks back and the detent-lever again engages the detent-wheel $i$ and prevents its further rotation. The fall of the plate $h$ acts, of course, as an annunciator-tag to indicate that the house is cut off, and this plate is therefore marked with the words "Off" and "On," one above the other, and the entire instrument D is inclosed in a suitable case or cover, on the front of which is a small reading opening or window over the face of the plate $h$, through which the words "On" or "Off" will show, according to the raised or fallen position of the tag, as fully illustrated in Fig. 1. When, therefore, the contact-plate $h$ falls, the householder will know that the circuit in the house is defective at some point and that the house is cut off, and he may send word to the central office that such is the fact and that the same should be remedied. I prefer, however, to employ an automatic telegraphic system connected with the cut-off, so that when the cut-off acts in any house the fact is immediately telegraphed to the central office, indicating the house which is thus cut off, so that the attendants at the central office can at once remedy the defect without any trouble on the part of the householders. In order to accomplish this I prefer to employ a distinct telegraphic line or circuit, $v$ $v$, for which the ordinary district-telegraph circuit will answer, which circuit is always or normally closed through a battery, $v'$, and a Morse recording-instrument, $w$, in the central office B, and also through a pair of contact tongues, 3 4, in each house. Now, the tongue 3 of each pair is longer than the other, and projects toward the periphery of a toothed signal-wheel, $x$, on the shaft of the detent-wheel $i$, and this signal-wheel is so toothed as to represent a telegraphic signal on the Morse system, which will indicate the particular house in which the wheel is placed, and each wheel in the different houses is of course differently toothed, as will be readily understood. It will be therefore seen that when the cut-off acts and releases the detent-wheel $k$, the wheel in revolving will also revolve the signal-wheel $x$, and the teeth thereof contacting with the tongue 3 will cause the tongues to separate and approach at intervals in the manner of a telegraphic key, and thus transmit a Morse signal along the line $v$, which will be received in the central office on the recorder $w$ in the same manner as in a district-telegraph system, and this recorded signal will at once show to the central attendant that a particular house is cut off, and he can at once send a man to remedy the defect before any objection comes from the house itself. The signal-circuit $v$ may be any ordinary distinct telegraphic circuit such as now used in cities, the battery-supply circuit $b$ $b$ being extended from the district office, so that I am thus enabled to combine my system with the ordinary district-telegraph system with little expense and with great advantage, which presents a great improvement in domestic electric systems.

In the circuit $v$ any number of ordinary district-call instruments may be introduced, whether in the houses provided with the battery-supply circuit $b$, as shown at $y$, or at any other positions along the line to which the battery-supply circuit does not connect, as the use of the circuit $v$ for the usual messenger, fire, and other calls will not interfere with the transmission of the cut-off signals, which will occur but seldom throughout the entire district; hence by this system not only may a series of houses be supplied with electricity from one point without trouble to the householder and at small expense, but the condition of the line is tested at intervals and its condition recorded; and, in addition to this the condition of the circuit in each house, when it becomes defective, is at once telegraphed to the central office, so that no defect can occur in the house or in the line without it being promptly known and remedied; and besides this, messenger or other calls may be sent from the houses at any time to the central office, thus providing a very complete and desirable electric system for domestic uses.

I do not of course confine myself to the exact form of cut-off instrument shown in Figs. 1 and 2, as this may be greatly varied without departing from the principle shown—that is, acting to break the circuit after a certain abnormal time or interval of closure, and hence any of the constructions shown in my former patent, No. 279,107, in the patent of Phelps, No. 281,202, and in the patents of Tirrell, No. 283,303, and Sawyer, No. 279,023, all showing automatic-timed cut-offs, may be employed in this case. It will be also understood that I do not limit myself to the precise form of telegraphic-signal instrument shown, as any equivalent may be employed, provided it is operatively connected with the cut-off instrument or with an equivalent of the cut-off, so that the signal-instrument is operated whenever the circuit remains closed for an abnormal interval.

It will be readily seen that an electro-magnet with a retarded armature connected with the detent-lever $k$ might be substituted for the electrolytic cell $s$ on the principle shown in the Tirrell patent, No. 283,303, and, if desired, the cut-off elements $l$ $r$ $n$ $h$ might be omitted and the wire $j$ connected to the magnet or the cell $s$ direct, in which case the cut-off would be dispensed with, but the signal device would remain intact, so that a signal would always be sent to the central office whenever the circuit was closed for an abnormal time in any particular house to show that that house needed attention. In most all cases, however, it will be desirable to combine the cut-off and signal in the manner illustrated, to cut off the house and telegraph the fact whenever the circuit remains closed abnormally long. In some cases, however, the telegraphic circuit might be omitted and the battery-supply circuit used alone with its cut-off in each house and circuit closer in the central office, as shown in the diagram in Fig. 4, in which the parts already described are indicated by the same letters—that is, E indicates the central battery; $b$, the battery-supply line; A, the houses; D, the cut-off instrument in each house, and C the circuit-closing clock with its alarm in the central office. On the other hand, where the telegraphic-signal circuit $v$, between the central office and the houses, is used, as shown in Fig. 1, the open-circuit instruments in each house may be supplied by a distinct local or house battery, as is now commonly done, instead of by the common central battery; and in case the circuit in any house becomes defective it will become broken by the automatic cut-off, and the fact telegraphed to the central office in the same way as before described; but of course it is much preferable to employ the common central battery, E, and the supply-line $b$ connecting to all the houses.

Instead of having distinct lines for the battery-supply and signal circuits, the same line may be used for both in the manner shown in Fig. 3. In this case $b'$ indicates a continuous metallic line which passes through the signal-tongues 3 4 in each house, connects to the telegraph-battery $v'$ and to the recorder $w$, and thus forms a constantly-closed circuit, similar to a district-telegraph line. The electrical system $g$ $m$ $m$ of each house is also connected to the line by the wires $j$, same as in Fig. 1, the opposite end of the system being connected to ground, as shown, and the cut-off contacts $r$ $n$ $h$ are introduced in the connection between the wire $j$ and conductor $g$, as before.

Now, E indicates the central supply-battery for the different houses, which has one pole connected to the line $b'$ while the opposite pole goes to ground, as illustrated. It will therefore be seen that if the circuit is closed in any house on the branches or instruments $m$, current will flow from the central battery, E, along the line $b'$, and go to ground through the house-instrument, the circuit being thus completed to the other side of the battery through the ground. At the same time, if any of the cut-offs act the signal will be sent along the closed line to the recorder $w$ in the central office. It will also be seen that any district-telegraph call may be sent along the closed line $b'$ without interfering with the flow of current from the central supply-battery, E, to any of the houses, this supply-battery E being of course always normally in open circuit, while the telegraph-battery $v'$ is normally in closed circuit, as will be understood. If the line $b'$ is cut at any point, it will be indicated by the action of the recorder $w$, or any equivalent instrument in the line, so that the circuit-closer or detective clock C and its adjuncts, as in Fig. 1, may be dispensed with.

Referring to Figs. 1 and 2, it will be seen that the electrolytic cell $s$ or its equivalent—such as an electro-magnet, with a retarded armature, &c.—may be described as an electric-motor device, operatively connected with the signal-instrument and with the cut-off contacts, and having its action timed or retarded, so that it acts to operate the signal-instruments or open the contacts only after the lapse of a determined interval of time.

What I claim is—

1. In a district electric system, the combination, with a central office and a series of distant houses, each provided with electrical instruments in open circuit, of a central battery and a common supply-line extending therefrom to the houses, and connecting with the instruments in the respective houses in multiple arc, with an automatic timed or retarded electric cut-off in each house branch of the multiple circuit, acting to cut off the house branch from the main line whenever the circuit through it remains closed beyond a normal period of time, substantially as herein set forth.

2. The combination, with a central office and a series of distant houses, each equipped with an open electric circuit, including suitable instruments and suitably supplied with battery, of a telegraphic circuit extending from the central office to the houses, having a receiving-instrument in the office, and individual signal-instruments in the houses, with an automatic timed or retarded electric-motor device in the open circuit of each house, operatively connected with the signal-instrument, substantially as set forth, so that a prolonged closure of the house-circuit operates the signal, substantially as and for the purpose set forth.

3. In a district electric system, the combination, with a central office and a series of distant houses, each house provided with electric instruments in an open circuit suitably supplied with battery, of an automatic retarded or timed electric cut-off in the circuit of said house-instruments, substantially such as described, with a telegraphic or signal circuit extending from the houses to the central office, having a receiving-instrument in the office and individual signal-instruments in the respective houses, and an operative connection between the aforesaid cut-off and the signal-instrument, whereby the action of the house cut-off due to prolonged closure sets off the signal, and automatically telegraphs to the central office that the circuit is defective in a particular house, substantially as herein set forth.

4. In a district electric system, the combination, with a central office and a series of houses, each provided with electrical instruments in open circuit, of a common battery-supply circuit extending from the central office to the circuits of each house, with electric alarming or indicating devices in the supply-circuit at the central office, and with an automatic timed or intermittent circuit-closer, acting to close the battery supply-circuit at intervals, substantially as and for the purpose herein set forth.

5. The combination, with a central office and a central or common battery having one end grounded, with a series of houses, each provided with electrical instruments arranged in open circuit and having one end grounded, with a line connecting the opposite side of the instruments to the opposite side of the battery, and with an automatic timed or retarded electric circuit-breaking device, substantially such as set forth, arranged in each house-circuit between the house-instruments and the central battery, substantially as and for the purpose set forth.

DAVID ROUSSEAU.

Witnesses:
JNO. E. GAVIN,
CHAS. M. HIGGINS.